Figure 1:
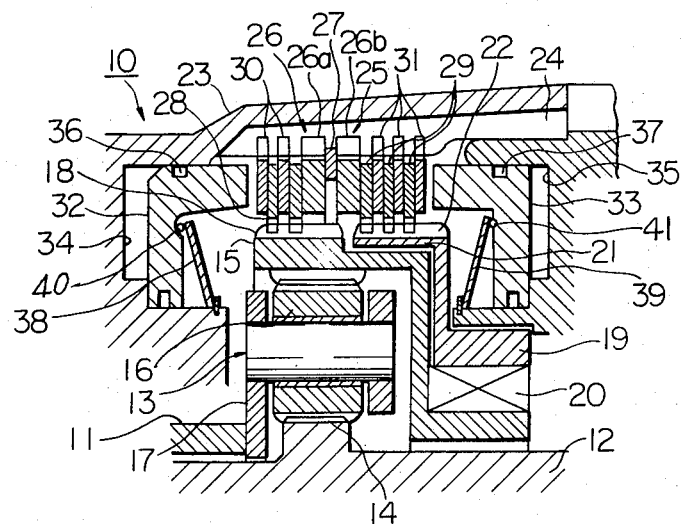

United States Patent
Ohtsuka et al.

[11] 3,772,940
[45] Nov. 20, 1973

[54] MULTIPLE DISC TYPE FRICTION BRAKE FOR AN AUTOMOTIVE AUTOMATIC POWER TRANSMISSION

[76] Inventors: Kunio Ohtsuka, No. 35 Yamate-cho, Naka-ku, Yokohama; Toshiyuki Miyauchi, No. 714, Nishiterao, Kanagawa-ku, Yokohama, both of Japan

[22] Filed: Jan. 18, 1972

[21] Appl. No.: 218,781

[52] U.S. Cl. .................................... 74/785, 188/71.5; 72.5, 192/85 AA; 87.13; 87.15
[51] Int. Cl. ................... F16h 57/10, F16d 55/10
[58] Field of Search ................... 74/768, 785, 769, 74/688; 188/71.5, 72.3, 72.4, 72.5; 192/48.4, 192/85 AA, 87.13, 87.15

[56] References Cited
UNITED STATES PATENTS

| | | | |
|---|---|---|---|
| 3,371,557 | 3/1968 | Lammert | 74/688 X |
| 3,599,512 | 8/1971 | Wayman | 188/72.4 X |
| 3,273,420 | 9/1966 | O'Malley | 74/688 X |
| 2,697,368 | 12/1954 | Winther et al. | 74/769 |
| 3,021,729 | 2/1962 | Chambers et al. | 74/769 X |
| 3,159,051 | 12/1964 | Herndon et al. | 74/688 X |
| 3,234,820 | 2/1966 | Tuck et al. | 74/688 |
| 3,298,252 | 1/1967 | Harris et al. | 74/769 X |
| 3,436,986 | 4/1969 | Lawrence | 74/768 |

*Primary Examiner*—Allan D. Herrmann
*Attorney*—Robert E. Burns et al.

[57] ABSTRACT

A multiple disc type friction brake for use in an automotive automatic power transmission including an input shaft, an output shaft, a planetary gear set having first and second rotary members, and a casing construction formed with a spline on its inner wall. The friction brake consists of a retaining plate splined to the spline of the casing construction and held axially fast thereon. The friction brake also consists of first and second sets of rotatable plates located on both sides of the retaining plate, and first and second rotatably plates which cooperate with the first and second sets of rotatable plates, respectively. The rotatable plates are splined on splines formed on the first and second rotary members respectively and axially movable toward and away from the retaining plate. The rotatably plates are splined to the spline of the casing construction for axial movement. First and second fluid pressure operated servo pistons are provided for actuating first and second sets of brake disc assemblies.

11 Claims, 2 Drawing Figures

MULTIPLE DISC TYPE FRICTION BRAKE FOR AN AUTOMOTIVE AUTOMATIC POWER TRANSMISSION

This invention relates in general to friction engaging devices and more particularly to a multiple disc type friction brake for use in an automotive automatic power transmission.

As is well known, many of the automotive automatic power transmissions usually employ a band type brake, multiple disc friction brake and one-way brake as a reaction member to selectively provide a plurality of gear ratios. The present invention is specifically directed to an improvement over the multiple disc type friction brake consisting of two sets of multiple disc brakes.

It is a principal object of the present invention to provide an improved multiple disc type friction engaging device for use in an automotive automatic power transmission.

Another object of the present invention is to provide an improved multiple disc type friction engaging device for use in an automotive automatic power transmission, which device is simplified in construction and economical to manufacture.

Still another object of the present invention is to provide an improved multiple disc type friction brake for use in an automotive automatic power transmission, which friction brake permits the use of minimum number of component parts thereby to provide a compact and simplified construction.

A further object of the present invention is to provide an improved multiple disc type friction brake for use in an automotive automatic power transmission, which friction brake is capable of reducing the overall length of the automatic power transmission.

In order to achieve these objects, the present invention contemplates to provide an improved friction engaging means comprising multiple disc type friction brake for use in an automotive automatic power transmission, which includes an input shaft or member, an output shaft, a planetary gear set operatively disposed between the input and output shafts for establishing a drive connection therebetween and having first and second rotary members each provided with a spline one rotary member having a portion thereof nested within the other rotary member, and a casing construction or stationary support member having at least one spline formed on the inner wall thereof. In a preferred embodiment of the present invention, the friction brake consists of an annular retaining plate which is splined to the spline of the casing construction at its periphery. The annular backing means is held in an intermediate portion of the spline and kept axially fast on the spline by a suitable means. The friction brake also consists of first and second disc brake assemblies which cooperate with the retaining plates splined on the spline of the casing construction. The first disc brake assembly is associated with the first rotary member and the second disc brake assembly is associated with the second rotary member. The first disc brake assembly is constructed by a plurality of annular rotatably plates and annular rotatably fixed plates which cooperate with each other. The rotatable plates are splined to the spline formed on the outer periphery of the first rotary member at their inner peripheries and axially movable toward and away from the retaining plates. The rotatably fixed plates are splined to the spline of the casing construction at their outer peripheries and are also axially movable. These rotatably fixed plates are interleaved between the rotatable plates. To engage these friction discs of the first disc brake assembly, a first fluid pressure operated servo piston is provided which is slidably disposed in a fluid chamber formed in the casing construction. The first servo piston is movable toward the retaining plates to effect engagement between the rotatable plates and rotatably fixed plates for thereby holding the first rotary member of the planetary gear set stationary with respect to the casing construction. A first return spring is operatively associated with the first servo piston for biasing the same away from the retaining plates to effect disengagement of the rotatable plates and the rotatably fixed plates. In similar manner, the second disc brake assembly consists of a plurality of annular rotatable plates and rotatably fixed plates which are cooperated with each other. The annular rotatable plates are splined to the spline formed on the outer periphery of the second rotary member of the planetary gear set at their inner peripheries and axially movable toward and away from the retaining plates. The rotatably fixed plates are splined to the spline of the casing construction at their outer peripheries and also axially movable. The rotatably fixed plates are interleaved between the driving plates. To engage these friction discs of the second disc brake assembly, a second fluid pressure operated servo piston is provided which is axially slidably disposed in a second fluid chamber formed in the casing construction. The second servo piston is also axially movable toward the retaining plates to effect engagement of the rotatable plates and the rotatably fixed plates for thereby holding the second rotary member of the planetary gear set stationary with respect the casing construction. To bias the second servo piston in the brake release position, a second return spring is provided.

Figure 2:
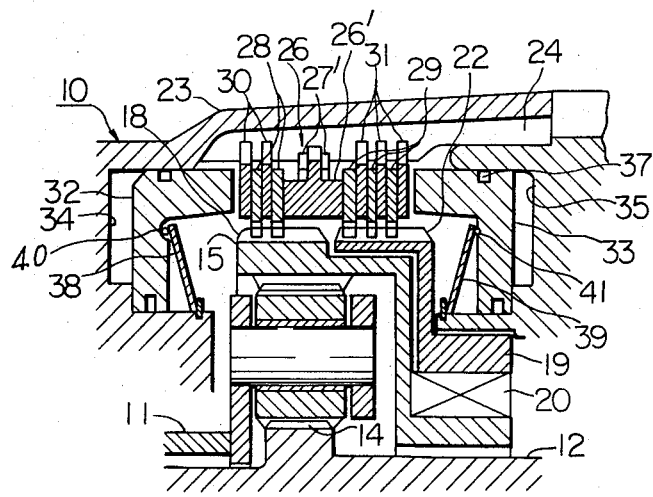

These and other objects and advantages of the present invention will become more apparent from the following description taken in conjunction with the accompanying drawings, in which:

FIG. 1 is a sectional view of a preferred embodiment of the multiple disc type friction brake according to the present invention; and FIG. 2 is a sectional view of a modified form of the multiple disc type friction brake shown in FIG. 1.

The multiple disc type friction brake of the present invention will be herein shown and described as applied to have only a ring gear of a planetary gear set of an automotive automatic power transmission to hold stationary with respect to a casing construction of the transmission, by way of example only. It should, however, be understood that the friction brake of the present invention is also applicable, in addition to the ring gear, to other moving parts of the planetary gear set, for example, to a pinion carrier thereof for selectively holding the ring gear and the pinion carrier stationary with respect to the casing construction to provide proper gear ratios.

Referring now to the drawings, and more particularly to FIG. 1, there is shown in section a part of an automotive automatic power transmission to which the multiple disc type friction brake of the present invention is applied. The automatic power transmission, generally designated by reference numeral 10, is shown to have an input shaft 11, an output shaft 12, a planetary gear set 13 which is operatively disposed between the input shaft 11 and the output shaft 12 for establishing a drive connection therebetween. The input shaft 11 may be connected to and driven by a prime mover (not shown) and the output shaft 12 may be connected to driving wheels of the automotive vehicle.

The planetary gear set 13 comprises, as customary, rotary members including a sun gear 14 integral with the output shaft 12, an internally toothed outer ring gear 15, and a plurality of planet pinions 16 (one of which is shown in FIG. 1) which externally mesh with the outer ring gear 15. The planet pinions 16 are carried by a pinion carrier 17 which is connected to the input shaft 11 an rotatable therewith. The outer ring gear 15 is formed with at least one spline 18 on the outer periphery, as illustrated. The ring gear 15 provided with the spline 18 is operatively connected to a drum member 19, between which a one-way brake 20 is disposed which may be of any known construction insofar as it functions to allow free rotation of the ring gear 15 in one direction but to prevent the ring gear 15 in the opposite direction. The drum member 19 has a drum portion 21 into which a half part of the ring gear 15 is rotatably disposed and which is formed with at least one spline 22 on its outer periphery.

As shown in FIG. 1, the transmission 10 also has a casing construction 23 which may be rigidly connected to a transmission housing (not shown). The casing construction 23 has at least one spline 24 formed on the inner wall thereof, to which a multiple disc type friction brake of the present invention is operatively associated.

The friction brake, which is generally indicated at 25, consists of a backing means 26 which is annular in shape. In the illustrated embodiment of FIG. 1, the annular retaining plate 26 is shown to include a pair of backing plates 26a and 26b, which are splined to the spline 24 at their outer peripheries. The backing plates 26a and 26b thus splined to the spline 24 are held axially fast by means of a snap ring 27. The snap ring 27 is retained in an annular groove (not identified) formed in the casing construction 23 at an intermediate portion of the spline 24 and rigidly secured thereto.

Located on both sides of the retaining plates 26 are first and second sets of rotatable plates 28 and 29 which are annular in shape. The first set of annular rotatable plates 28 are splined to the spline 18 of the ring gear 15 at their inner peripheries and axially movable toward and away from the backing plate 26a. Likewise, the second set of annular rotatable plates 29 are splined to the spline 22 formed on the drum portion 21 of the drum member 19 and axially movable toward and away from the backing plate 26b.

The friction brake 25 also consists of first and second sets of rotatably fixed plates 30 and 31 which cooperate with the first and second sets of rotatable plates 28 and 29, respectively. The first set of rotatably fixed plates 30 are annular in shape and splined to the spline 24 of the casing construction 23 for axial movement toward and away from the backing plate 26a. The rotatably fixed plates thus splined to the spline 24 are interleaved between the first set of annular rotatable plates 28, as illustrated in FIG. 1. In similar fashion, the second set of rotatably fixed plates 31 are annular in shape and splined to the spline 24 of the casing construction 23 for axial movement toward and away from the backing plate 26b. As shown, the second set of annular rotatably fixed plates 31 are interleaved between the annular rotatable plates 29.

To actuate these friction discs, first and second fluid pressure operated servo pistons 32 and 33 are provided which are axially slidably disposed in respective fluid chambers 34 and 35. The fluid chambers 34 and 35 are formed in the casing construction 23 and communicate with a source of fluid under pressure. Indicated at 36 and 37, are sealing means each of which seals off the fluid path between the inner wall of the fluid chamber and the outer wall of the servo piston.

First and second return springs 38 and 39 are associated with the first and second fluid pressure operated servo pistons 32 and 33, respectively. Each of the return springs 38 and 39 is in the form of an annular Belleville washer and functions to bias the servo piston away from the retaining plate 26 to effect disengagement of the rotatable plates and the rotatably fixed plates. At the point of engagement of the servo piston 32 with the outer peripheral wall of the return spring 38, there is provided an annular round wire 40 which establishes a pivotal action to reduce friction and binding between the spring 38 and the servo piston 32. For the same purpose, an annular round wire 41 is located between the outer peripheral wall of the spring 39 and the piston 33.

When the first piston 32 is moved to the right as viewed in FIG. 1, as by the application of fluid under pressure within the fluid chamber 34 to the inside face (not identified) of the first piston 32, the first servo piston 32 compesses the rotatably fixed and rotatable plates 30 and 28 between the piston and the backing plate 26a so that the first sets of plates 28 and 30 are engaged to hold the ring gear 15 stationary with respect to the casing construction 23. When, in contrast, the fluid under pressure is released from behind the first piston 32, the first servo piston 32 is moved to the left by the action of the return spring 38 associated therewith with a resultant disengagement of the first sets of plates 28 and 30 so that the ring gear 15 is freely rotatable. It is to be noted that the operation of the second servo piston 33 is the same as that of the first servo piston 32 and therefore the same is herein omitted for the sake of simplicity of illustration.

If it is required that the ring gear 15 be prevented from rotating in reverse direction at a given gear ratio, then the second servo piston 33 is actuated to hold the drum member 19 connected to the outer wheel (not shown) of the one-way brake 20 stationary with respect to the casing construction 23. If, however, it is required that the engine braking action be effected by shifting into a reduced gear ratio during coasting downhill, then the first servo piston 32 is actuated to directly hold the ring gear 15 of the planetary gear set 13 with respect to the casing construction 23.

FIG. 2 illustrates a modified form of the multiple disc type friction brake according to the present invention, like component parts are designated by the same numerals as used in FIG. 1 with the exception that a prime (') has been added thereto. In this modification, the retaining plate 26 is shown to include a unitary annular backing plate 26' which serves as a common element for the first and second sets of friction discs. The unitary annular retaining plate 26' is splined to the spline 24 of the casing construction 23 at its outer periphery. As shown in FIG. 2, the unitary retaining plate 26' is held axially fast on the spline 24 of the casing construction by means of a pair of snap rings 27'. The operation of the friction brake in this modification is the same as that of the friction brake shown in FIG. 1 and hence the detailed description of the same is herein omitted.

It will now be appreciated that the multiple disc type friction brake implementing the present invention permits the use of minimum number of component parts to provide a compact construction for thereby reducing space requirement therefor with a resultant decrease in overall length of the automatic power transmission.

It will also be understood that the casing construction of the automatic power transmission is provided with at least one spline on the inner wall thereof and accordingly the time required for working process will be significantly decreased.

It will further be noted that the friction brake of the present invention will provide a ease of assembling due to its inherent construction.

Moreover, the number of rotatable and rotatably fixed plates will be easily varied according to the requirements and the component parts will be readily replaceable.

What is claimed is:

1. A multiple disc type friction engaging device for use in an automotive automatic power transmission including an input shaft, and output shaft, a planetary gear set operatively disposed between said input and output shafts for establishing a drive connection therebetween, said planetary gear set including first and second rotary members each having a spline formed thereon at its outer periphery, and a casing construction having at least one spline formed on the inner wall of said casing construction, said friction engaging device comprising an annular retaining plate splined to said spline of said casing construction at an intermediate portion thereof, said annular retaining plate being held axially fast on said spline at the intermediate portion thereof, first and second sets of annular rotatable plates located on both sides of said annular retaining plate, said first and second sets of annular rotatable plates being splined to said splines of said first, and second rotary members at their inner periphery and axially movable toward and away from said annular retaining plate, first and second sets of annular rotatably fixed plates associated with said first and second sets of annular rotatable plates and splined to said spline of said casing construction at their outer periphery to be axially movable, said first set of annular rotatably fixed plates being interleaved between said first set of annular rotatable plates while said second set of annular rotatably fixed plates are interleaved between said second set of annular rotatable plates, means defining first and second fluid chambers in said casing construction, first and second fluid pressure operated servo pistons slidably disposed in said first and second fluid chambers, respectively, said first and second fluid pressure operated servo pistons movable toward said annular retaining plate for selectively effecting engagements between said first set of annular rotatable plates and said first set of annular rotatably fixed plates and between said second set of annular rotatable plates and said second annular rotatably fixed plates when a fluid under pressure is selectively admitted to said first and second fluid chambers, and first and second return springs biasing said first and second fluid pressure operated servo pistons away from said annular retaining plate thereby effecting the disengagement of said first set of annular rotatable plates from said first set of annular rotatably fixed plates and of said second set of annular rotatable plates from said second set of annular rotatably fixed plates.

2. In combination: an automotive automatic power transmission having an input shaft, an output shaft, a planetary gear set operatively disposed between said input and output shafts for establishing a drive connection therebetween at a given gear reduction ratio, said planetary gear set having a sun gear disposed on said output shaft, a plurality of planet pinions meshing with said sun gear, a pinion carrier fixed to said input shaft carrying the planet pinions, and an internally toothed outer ring gear meshing with said plurality of planet pinions, said outer ring gear having at least one spline formed at its outer periphery, a drum member, means mounting same to said outer ring gear of said planetary gear set including a one-way brake, said drum member having a drum portion formed with at least one spline and accommodating therein a half part of said outer ring gear of said planetary gear set, and a casing construction having at least one spline formed on the inner wall thereof; and friction engaging means comprising a retaining plate splined to said spline of said casing construction at an intermediate portion thereof, said retaining plate being held axially fast on said spline of said casing construction at the intermediate portion thereof, first and second sets of rotatable plates located on both sides of said retaining plate and splined to the splines of said outer ring gear and said drum portion, respectively, said first and second sets of rotatable plates being axially movable toward and away from said retaining plate, first and second sets of rotatably fixed plates associated with said first and second sets of rotatable plates, respectively, said first and second sets of rotatably fixed plates being splined to said spline of said casing construction and axially movable toward and away from said retaining plate, and first and second fluid pressure operated servo pistons which are axially movable toward and away qrom said retaining plate for effecting engagement and disengagement between said first and second sets of rotatable plates and said first and second sets of rotatably fixed plates.

3. A combination according to claim 2, wherein said retaining plate includes a pair of annular backing plates which are splined to said spline of said casing construction at outer peripheral walls of said backing plates.

4. A combination according to claim 3, further comprising means holding said annular backing plates axially fast comprising a snap ring fixedly connected to said spline of said casing construction.

5. A combination according to claim 2, wherein said retaining plate includes a unitary annular backing plate which is splined to said spline of said casing construction at its outer peripheral wall.

6. A combination according to claim 5, further comprising means holding said unitary annular backing plate axially fast comprising a pair of snap rings fixedly connected to said spline of said casing construction at the intermediate portion thereof.

7. In combination: an automotive power transmission having an input shaft, an output shaft, a planetary gear set operatively disposed between said input and output shafts for establishing a drive connection therebetween at a given gear reduction ratio, said planetary gear set having a sun gear disposed on said output shaft, a plurality of planet pinions meshing with said sun gear and a pinion carrier fixed to said input shaft carrying the planet pinions and an internally toothed outer ring gear meshing with said plurality of planet pinions, said outer ring gear having at least one spline formed at its outer periphery, a drum member, means mounting same on said outer ring gear of said planetary gear set including a one-way brake, said drum member having a drum portion having at least one spline and accommodating therein a half part of said outer ring gear of said planetary gear set, and a casing construction having at least one spline formed on the inner wall thereof; and friction engaging means comprising an annular retaining plate splined to said spline of said casing construction at an intermediate portion thereof, said annular retaining plate being held axially fast on said spline of said casing construction at the intermediate portion thereof, first and second sets of annular rotatable plates located on both sides of said annular retaining plate, said first and second sets of annular rotatable plates being splined to said splines of said outer ring gear and said drum portion, respectively, at inner peripheries of said first and second sets of rotatable plates and axially movable toward and away from said annular retaining plate, first and second sets of annular rotatably fixed plates associated with said first and second sets of annular rotatable plates and splined to said spline of said casing construction at their outer peripheries to be axially movable, said first set of annular rotatably fixed plates being interleaved between said first sets of annular rotatable plates while said second set of annular rotatably fixed plates are interleaved between said second set of annular rotatable plates, means defining first and second fluid chambers formed in said casing construction, first and second fluid pressure operated servo pistons slidably disposed in said first and second fluid chambers, respectively, said first and second fluid pressure operated servo pistons being movable toward said annular retaining plate for effecting engagements between said first set of annular rotatable plates and said first set of annular rotatably fixed plates and between said second set of annular rotatable plates and said second set of annular rotatably fixed plates when a fluid under pressure is supplied into said first and second fluid chambers, and first and second return springs biasing said first and second fluid pressure operated servo pistons away from said annular retaining plate for effecting the disengagement of said first set of annular rotatable plates from said first set of annular rotatably fixed plates and of said second set of annular rotatable plates from said second set of annular rotatably fixed plates.

8. In combination: a stationary support member; an input member rotatably driven in use with respect to the support member; an output shaft rotatable about its longitudinal axis with respect to said support member; means connecting said input member to said output shaft including a first hub mounted for rotation about said longitudinal axis and having a first cylindrical drum connected at one end thereto and coaxial with said output shaft, a second hub mounted for rotation about said longitudinal axis and having a second cylindrical drum connected at one end thereto and having a portion thereof nested within said first cylindrical drum; and friction engaging means for selectively frictionally engaging the portion of said second cylindrical drum not nested within said first cylindrical drum with said support member thereby braking rotation of said second cylindrical drum and for selectively frictionally engaging said first cylindrical drum with said support member thereby braking rotation of said first cylindrical drum.

9. A combination according to claim 8, wherein said friction engaging means comprises a retainig plate fixedly mounted with respect to said support member, a first set of rotatable plates disposed on one side of said retaining plate and splined to said first cylindrical drum for rotational movement therewith and axial movement along said longitudinal axis, a second set of rotatable plates disposed on the other side of said retaining plate and splined to said portion of said second cylindrical drum not nested with said first cylindrical drum for rotational movement therewith and axial movement along said longitudinal axis, a first set of rotatably fixed plates disposed on said one side of said retaining plate and splined to said support member for axial movement along said longitudinal axis, a second set of rotatably fixed plates disposed on said other side of said retaining plate and splined to said support member for axial movement along said longitudinal axis, and means for selectively moving the first sets of rotatable plates and rotatably fixed plates towards said retaining plate to effect the frictional engagement of the two sets of plates thereby engaging said first cylindrical drum with said support member and for selectively moving the second sets of rotatable plates and rotatably fixed plates towards said retaining plate to effect the frictional engagement of the two sets of plates thereby engaging said portion of said second cylindrical drum not nested with said first cylindrical drum with said support member.

10. A combination according to claim 9, wherein said first sets of rotatable plates and rotatably fixed plates are interleaved and said second sets of rotatable plates and rotatably fixed plates are interleaved.

11. A combination according to claim 9, wherein said means for selectively moving comprises first and second fluid operated servo pistons driving the first sets of plates and the second sets of plates respectively along said longitudinal axis.

* * * * *